(12) United States Patent
Vignotto et al.

(10) Patent No.: US 6,190,102 B1
(45) Date of Patent: Feb. 20, 2001

(54) STUDS FOR CONNECTING A WHEEL AND A BRAKE ELEMENT TO A MOTOR VEHICLE WHEEL HUB UNIT

(75) Inventors: Angelo Vignotto, Turin; Carlo Maldera, Giaveno, both of (IT)

(73) Assignee: SKF Industrie S.p.A., Turin (IT)

( * ) Notice: Under 35 U.S.C. 154(b), the term of this patent shall be extended for 0 days.

(21) Appl. No.: 09/430,428

(22) Filed: Oct. 29, 1999

(30) Foreign Application Priority Data

Nov. 2, 1998 (IT) .................................................. T098A0923

(51) Int. Cl.⁷ .............................. F16B 23/00; F16B 35/06
(52) U.S. Cl. ........................ 411/399; 411/107; 411/424; 411/999; 301/105.1
(58) Field of Search .................................. 411/107, 411, 411/424, 399, 970, 999; 301/105.1

(56) References Cited

U.S. PATENT DOCUMENTS

| 2,056,688 | * | 10/1936 | Peterka et al. | 411/399 X |
| 4,396,309 | * | 8/1983 | McCormick | 411/399 X |
| 5,516,248 | * | 5/1996 | DeHaitre | 411/399 X |
| 5,802,680 | * | 9/1998 | Postelwait | 411/107 X |

* cited by examiner

*Primary Examiner*—Neill Wilson
(74) *Attorney, Agent, or Firm*—Merchant & Gould P.C.

(57) ABSTRACT

A stud comprises a head and a stem with a threaded end length and a length having an axial knurling proximate to the head and adapted to be driven with radial interference into an axial bore of a radial flange portion fast for rotation with the hub of a motor vehicle wheel. The stud comprises at least one knurled surface having an area other than zero in a projection on a plane perpendicular to the longitudinal axis of the stud. The knurled surface is adapted to co-operate with the radial flange portion for preventing rotation of the stud.

10 Claims, 5 Drawing Sheets

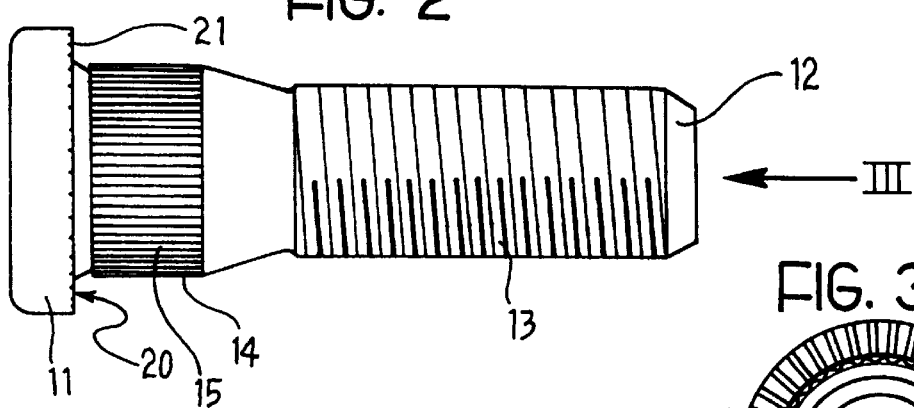
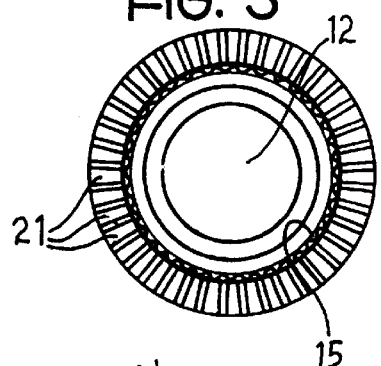
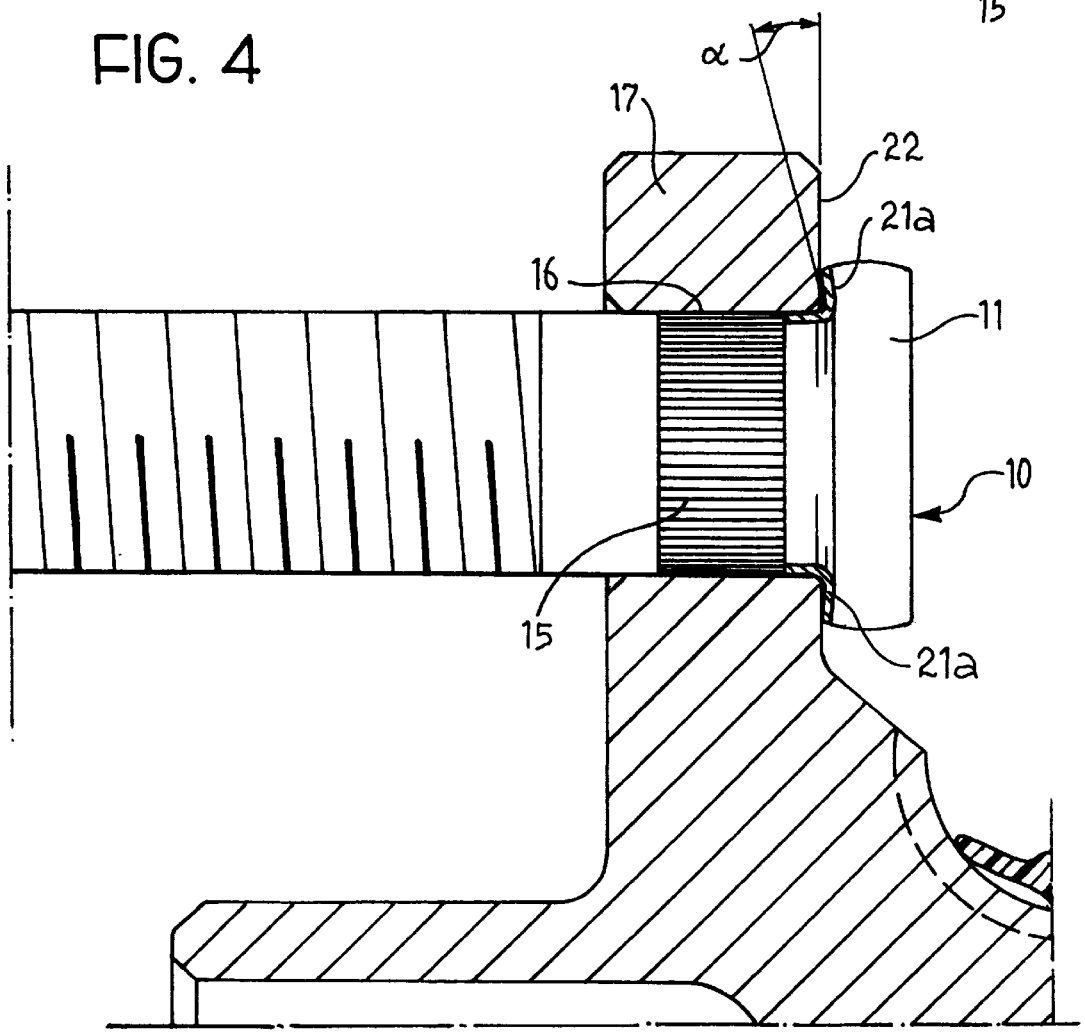

STUDS FOR CONNECTING A WHEEL AND A BRAKE ELEMENT TO A MOTOR VEHICLE WHEEL HUB UNIT

DESCRIPTION

1. Field of the Invention

The present invention refers to a stud for connecting a wheel and a brake element to the hub unit of a motor vehicle.

2. Background of the Invention

To fix the rim and the brake element (disc or drum) to the hub unit of a wheel, most of the known solutions provide that the rim, a flange of the brake member and a flange of the hub or hub/bearing unit are axially flanked so as to align bores formed in these elements. Studs are then driven in said bores from the axially inner side of the hub flange.

An example of this prior art is illustrated in axial cross section in FIG. 1. Usually, four or five studs 10 are employed each having a head 11 and a stem 12 with a threaded end portion 13 and a length 14 having an axial knurling 15 of overall cylindrical shaped proximate to the head 11.

The studs 10 are forcefully driven into circular axial bores 16 formed in the radial flange 17 of the hub 18 with radial interference of the cylindrical knurlings 15 with respect to the bores 16. After this forced insertion, first the brake member and then the wheel rim (not shown) are inserted from the outside on the end portions of the stud stems. Finally, outer nuts (not shown) are screwed and tightened with a predetermined torque.

The knurlings 15 serve to rotationally lock the studs relative to the hub flange both when the aforesaid tightening torque is applied and when the nut is unscrewed for removing the wheel and/or the brake member.

Such locking effect can nevertheless fail due to the same forced driving step itself. In order that the knurling may engrave the material of the flange, the studs are previously hardened and tempered. However, the crests of a knurling are particularly difficult to harden in that, being sharp parts, they tend to decarburize. Therefore, in being forcefully driven as said, the crests of the knurling are abraded and the anti-rotation coupling loses its efficiency. This problem, besides being uncontrollable, appears when in attempting to tighten the nuts, the studs rotate, rendering this operation difficult.

It is of primary importance that the studs are precisely oriented parallel to the axis of rotation, as they must pass through the series of aligned bores of the brake member and the rim. If this is not the case, a difficulty is encountered in trying to mount the brake and/or the rim, that in some cases cannot be slipped on the studs.

The above cited forced coupling also involves a problem concerning the angular position of the studs. In fact, if the radial interference between the knurling 15 of the stud and the bore 16 of the hub flange is excessive, the position of the projecting part of the stud may vary considerably as the application of an excessively high driving force adversely affects the accuracy with which the stud remains positioned after its insertion. It is known that the driving inevitably involves an angular deviation which is uncontrollable and to some extend proportional to the force being applied.

A further problem concerning the driving lies in that, owing to the considerable radial interference required, lumps of material 20 removed from the bores 16 are inevitably formed on the axially outer face 19 of the hub flange. Formations of this kind are undesired as they constitute protrusions on the outer face 19. Instead, this face should ideally provide a completely flat surface against which the brake member abuts.

Moreover, the above discussed conventional driving technique causes deformation of the hub flange outer surface in form of local swellings near the bores.

In addition, the high axial driving forces cause further deformation in form of radial undulations on the axially outer face of the hub or beating flange.

Owing to all of these factors, the outer surface 19 does no longer provide a flat resting surface perpendicular to the axis of rotation. As a result, anomalous vibration occurs in operation.

SUMMARY OF THE INVENTION

It is an object of the present invention to provide improved studs capable of being coupled to the hub unit of motor vehicle wheel in such manner as to obviate the above discussed drawbacks.

This object is accomplished, in accordance with an aspect of the invention, by the provision of a stud for connecting a wheel and a brake element to a motor vehicle wheel hub, the stud comprising a head and a stem with a threaded end length and a length having an axial knurling proximate to the head and adapted to be driven with radial interference into an axial bore of a radial flange portion fast for rotation with the hub, wherein the stud comprises at least one knurled surface having an area other than zero in a projection on a plane perpendicular to the longitudinal axis of the stud, said at least one knurled surface being adapted to co-operate with said radial flange portion for preventing rotation of the stud relative to said flange portion.

In accordance with another aspect of the invention, there is provided a hub bearing unit for a motor vehicle wheel, the unit having a radial flange portion with a plurality of axial bores formed therein for accommodating with radial interference a plurality of studs for securing a brake member and a wheel rim to said flange portion, wherein said plurality of studs includes at least one stud as set forth herein above.

BRIEF DESCRIPTION OF THE DRAWINGS

The features and the advantages of the invention will appear from the detailed description of a few embodiments thereof, given by way of non-limiting example, reference being made to the accompanying drawings, in which:

FIG. 2 is a side view of a first embodiment of a stud in accordance with the present invention;

FIG. 3 is a front view of the stud of FIG. 2 as seen according to arrow III;

FIG. 4 is a partial cross sectional view of a motor vehicle wheel hub equipped with a second embodiment of a stud in accordance with the invention;

DETAILED DESCRIPTION OF PREFERRED EMBODIMENTS

Figure 1:
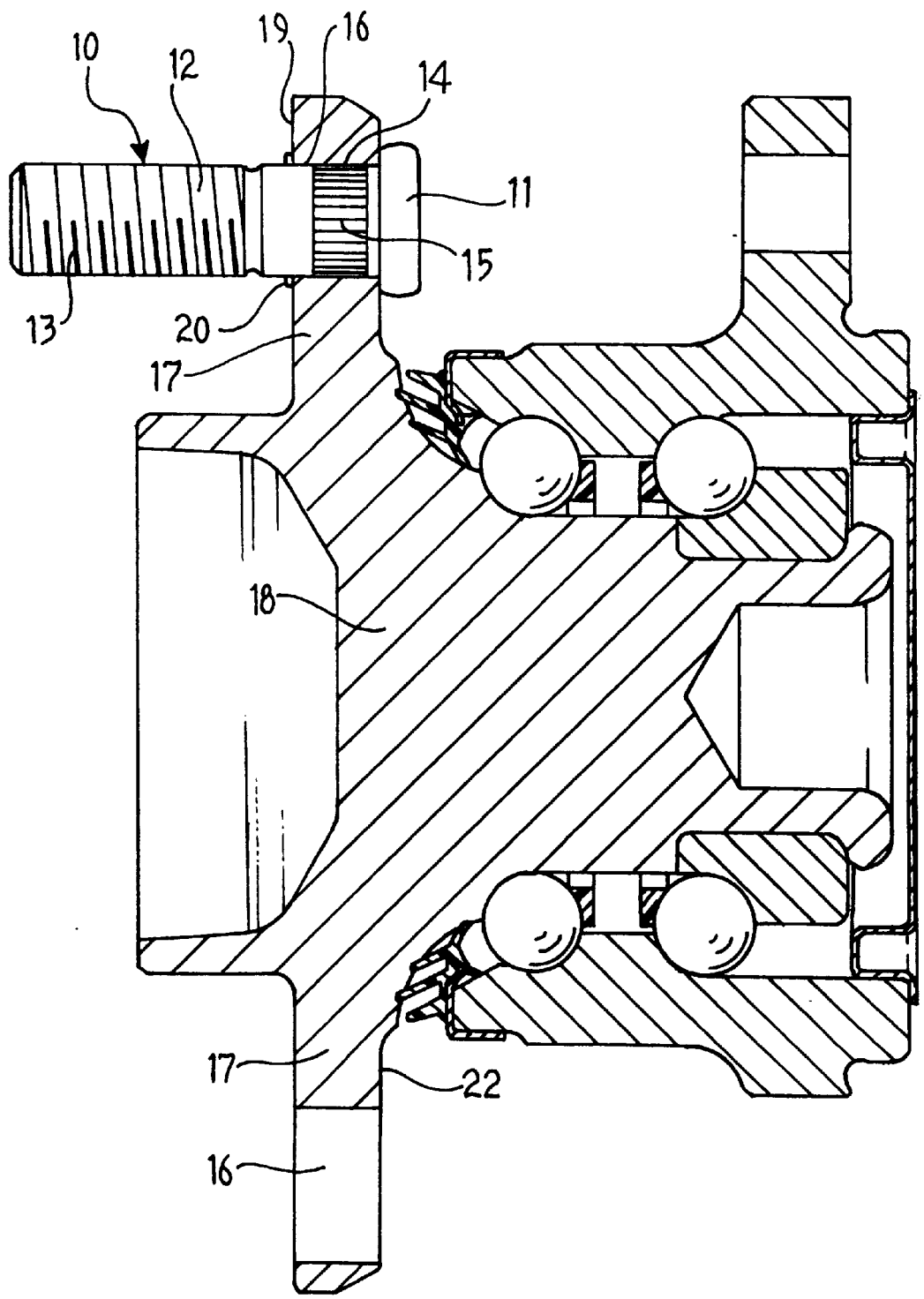
FIG. 1 is an axial cross sectional view of a hub bearing unit of a motor vehicle wheel equipped with conventional studs.

With reference to FIG. 2, a stud in accordance with a first embodiment of the present invention is indicated 10. The stud 10 has a head 11 and a stem 12 with a threaded end length 13 and a length 14 having a cylindrical axial knurling 15 proximate to the head 11.

According to the invention, and as shown in FIG. 3, the base 20 of the head 11 has a knurled surface 21 arranged in a plane which is radial with respect to the longitudinal axis of the stud. In the preferred embodiment of the invention shown in FIG. 3, the knurled surface 21 is in form of corrugations arranged in a radius-like configuration on the base of the head.

The stud 10 is forcefully driven with radial interference of the axial knurling 15 into one of the bores 16 of a radial flange portion 17 of a motor vehicle wheel hub. As compared to the prior art solutions discussed in the introductory part of the description, the radial interference between the axial knurling 15 and the bore 16 is reduced considerably, whereby the driving axial force transmitted to the hub flange 17 is also reduced. This allows to avoid the previously discussed inconveniences.

The task of contrasting rotation of the stud upon tightening the conventional fastener nuts (not shown) is mainly assigned, in accordance with the invention, to the radial knurling 21, the crests of which engrave or anyway deform locally that part of the axially inner side 22 of the radial flange 17 against which the head of the stud abuts.

By virtue of this arrangement, the radial interference between the bore 16 and the axial knurling 15 can be reduced, passing e.g. from the conventional range of 0.17–0.45 mm to a range of about 0.05–0.17 mm. In order to reduce such interference, the bores of the hub flange are preferably made of a slightly larger diameter with respect to conventional solutions.

Referring to FIG. 4, there is illustrated a second embodiment of a stud in accordance with the invention, in which the knurled surface indicated 21a and formed on the base of the head 11 is disposed on an axial conical surface that widens in the direction of the threaded end portion of the stud stem. Preferably, the angle α of said conical surface is of about 20 degrees in an axial plane.

Figure 5:
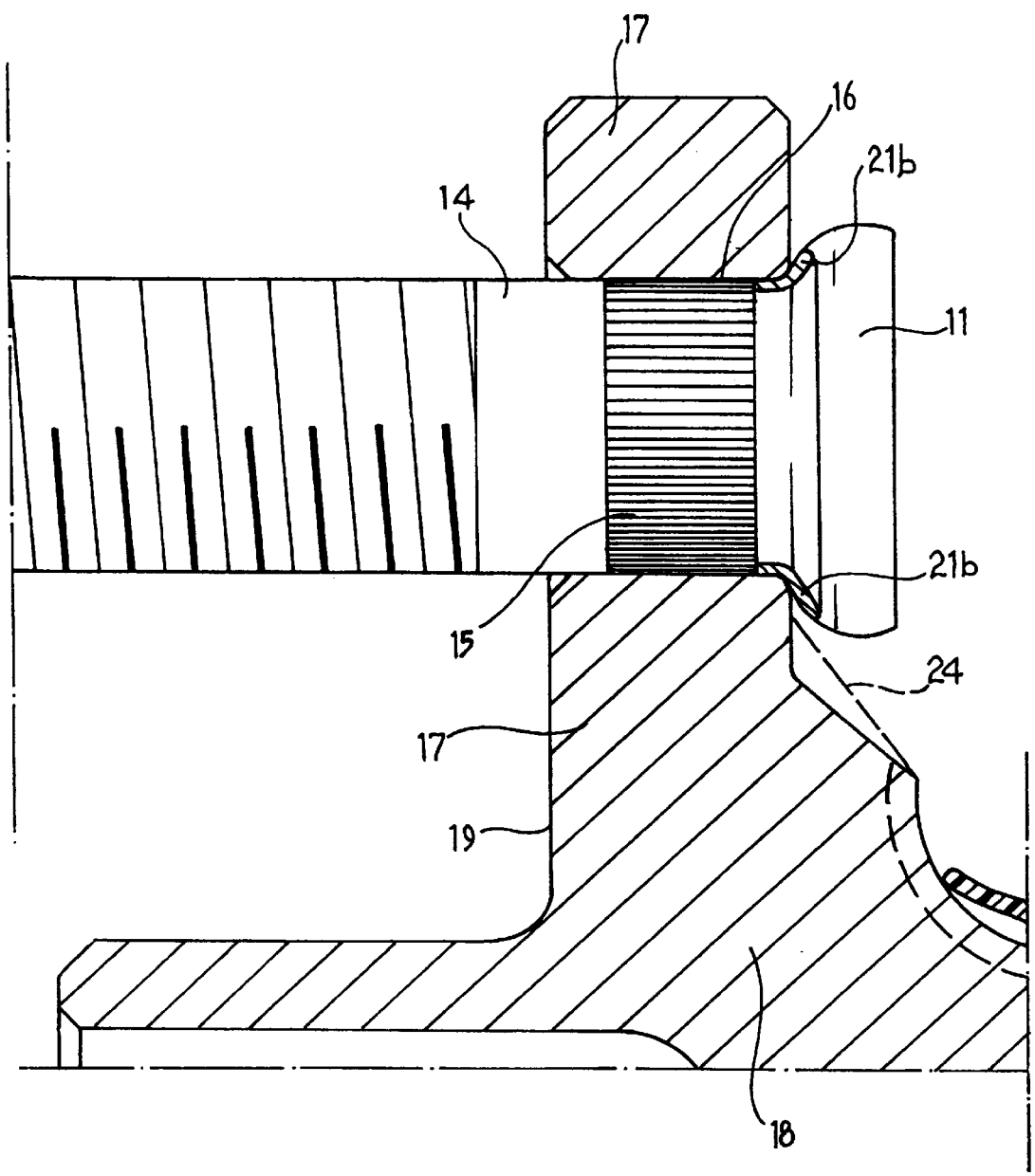
FIGS. 5 and 6 are partial axial cross sectional views of a motor vehicle hub flange fitted with a third embodiment of a stud according to the invention.

With reference to FIG. 5, according to a third embodiment of the invention, the knurled surface 21b formed on the base of the head 11 is arranged on an axial conical surface that tapers in the direction on the threaded end portion of the stud stem. In this variant, the head 11 does not longer come into abutment with the axially inner side 22 of the flange 17. Instead, the conical knurled surface 21b abuts against the mouth of the axial bore 16. The mouth of the bore provides a circumference of sure contact for the stud, thereby further guaranteeing a gradual grip for the knurling 21b when the fastening nuts are tightened.

Figure 6:
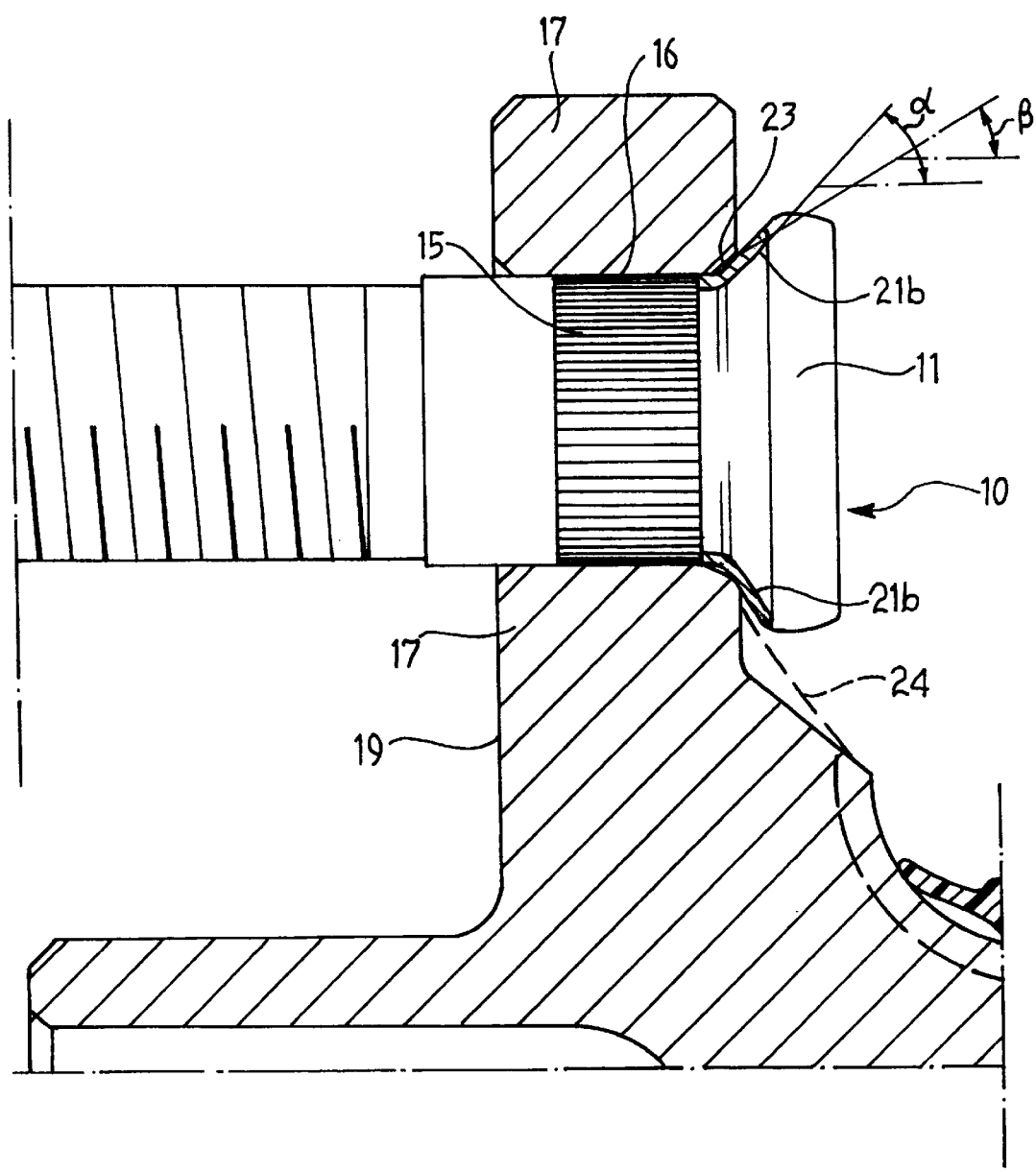

In FIG. 6 there is shown an example in which the mouth of the bores 16 is chamfered at 23. With a so formed flange, the angle α of the knurled surface will preferably be greater than the angle β of the chamfer 23.

The embodiments of FIGS. 5 and 6 involve a first particular advantage in that no accurate machining is required in order to render the side 22 of flange 17 perfectly smooth. A second, further advantage is the possibility of making the joining zone of the flange 17 axially thicker in proximity of the bores 16, as schematically indicated at 24, as this zone is known to be critical as regards structural strength. Whereas this joining zone has to be machined to form a radial abutting surface for studs having a head with a flat base, in the embodiments of FIGS. 5 and 6 the joining zone 24 can be advantageously exploited.

Figure 7:
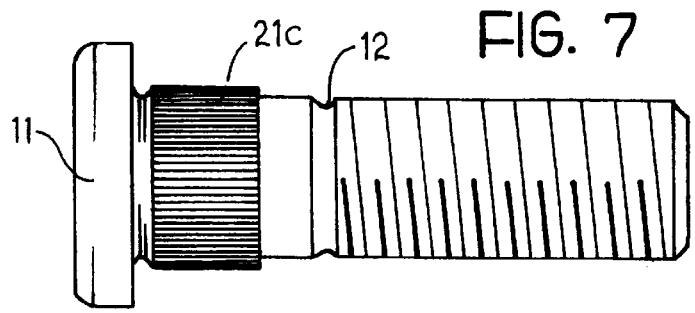
FIG. 7 is a side view of a fourth embodiment of a stud according to the invention.
Figure 8:
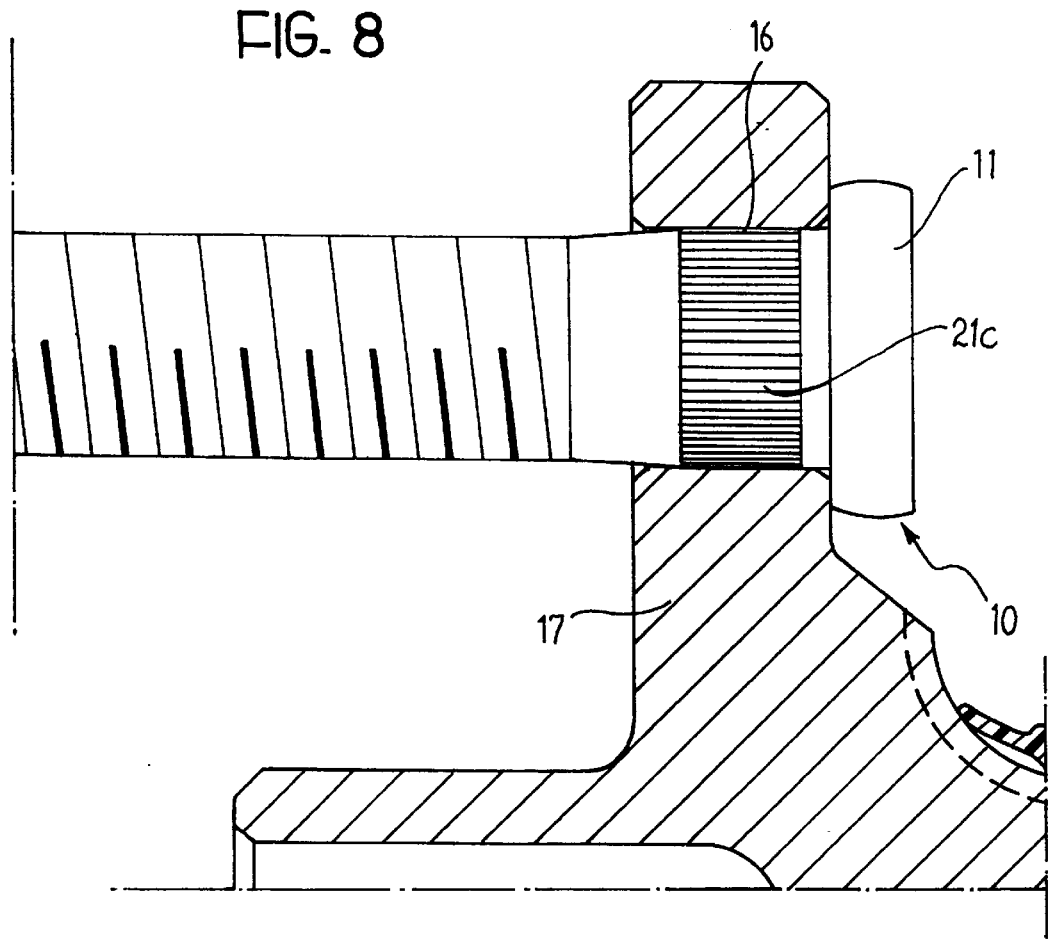
FIG. 8 is a partial cross sectional view of a motor vehicle wheel hub equipped with a stud as shown in FIG. 7.

Referring to FIGS. 7 and 8, according to a further embodiment of the stud according to the present invention, formed on the stem 12 is a conical knurled surface 21c that tapers in the direction of the threaded end portion 13. The knurled surface 21c is radially dimensioned so as to provide a minimum radial interference when inserting the stud in the bore 16. The interference increases progressively as the stud penetrates the bore and is tightened by the fastening nut. The angle of the knurled surface 21c is preferably low, ranging between 0 and 10 degrees, so as to ensure that the stem is oriented precisely parallel to the axis of rotation of the hub. Preferably, as shown in FIG. 8, the knurling 21c is substantially cylindrical in its length near the head 11, and conical in its length nearer to the threaded portion of the stem.

The conical knurling 21c can be formed in the same press-forging operation in which the stud is made. Alternatively, a rough-shaped element with a smooth conical zone near the head can be formed in a first manufacturing step, and the corrugations can be formed at al later stage by means of a knurling tool.

Figure 9:
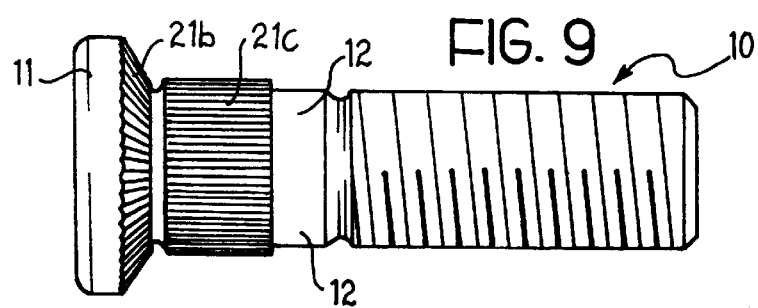
FIG. 9 is a side view of a fifth embodiment of a stud in accordance with the invention.

Finally, as illustrated in FIG. 9, according to a still further embodiment of the invention, a knurling is provided on the base of the head, for example a conical knurling 21b of the kind shown in FIG. 5, and a further conical knurling 21c is formed on the stem, as shown for example in FIGS. 7 and 8.

What is claimed is:

1. A stud for connecting a wheel and a brake element to a motor vehicle wheel hub, the stud comprising a head and a stem with a threaded end length and a length having an axial first knurled surface proximate to the head and adapted to be driven with radial interference into an axial bore of a radial flange portion fast for rotation with the hub, wherein the stud further comprises at least one second knurled surface, said at least one second knurled surface having an area other than zero in a projection on a plane perpendicular to a longitudinal axis of the stud, said at least one second knurled surface being adapted to co-operate with said radial flange portion for preventing rotation of the stud relative to said flange portion.

2. A stud as claimed in claim 1, wherein said at least one second knurled surface is provided on a base of the stud head facing the stud stem.

3. A stud as claimed in claim 2, wherein said at least one second knurled surface is formed in a radial plane generally perpendicular to the longitudinal axis of the stud.

4. A stud as claimed in claim 2, wherein said at least one second knurled surface is disposed on a conical surface tapering in the direction of said threaded end length of the stud stem.

5. A stud as claimed in claim 2, wherein said at least one second knurled surface is disposed on a conical surface tapering in the direction opposite to the threaded end length of the stud stem.

6. A hub bearing unit for a motor vehicle wheel, the unit having a radial flange portion with a plurality of axial bores formed therein for accommodating with radial interference a plurality of studs for securing a brake member and a wheel rim to said flange portion, wherein said plurality of studs includes at least one stud as claimed in claim 1.

7. A stud for connecting a wheel and a brake element to a motor vehicle wheel hub, the stud comprising a head and a stem with a threaded end length and a length having an axial first knurled surface proximate to the head and adapted to be driven with radial interference into an axial bore of a radial flange portion fast for rotation with the hub, wherein said first knurled surface tapers in the direction of the threaded length of the stem.

8. A hub bearing unit for a motor vehicle wheel, the unit having a radial flange portion with a plurality of axial bores formed therein for accommodating with radial interference a plurality of studs for securing a brake member and a wheel rim to said flange portion, wherein said plurality of studs includes at least one stud as claimed in claim 6.

9. A stud as claimed in claim 7, wherein said first knurled surface tapers in the direction of the threaded length of the stem at a non-uniform rate.

10. A stud as claimed in claim 7, further comprising a second knurled surface, said second knurled surface having an area other than zero in a projection on a plane perpendicular to the longitudinal axis of the stud, said at least one second knurled surface being adapted to co-operate with said radial flange portion for preventing rotation of the stud relative to said flange portion.

* * * * *